United States Patent
Nixon (10) Patent No.: US 11,595,513 B2
(45) Date of Patent: Feb. 28, 2023

(54) SITE LINK TESTER VIA UNIQUE PHONE EMULATION

(71) Applicant: CenturyLink Intellectual Property LLC, Broomfield, CO (US)

(72) Inventor: John Nixon, Irving, TX (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 57 days.

(21) Appl. No.: 17/122,798

(22) Filed: Dec. 15, 2020

(65) Prior Publication Data

US 2021/0314437 A1 Oct. 7, 2021

Related U.S. Application Data

(60) Provisional application No. 63/004,881, filed on Apr. 3, 2020.

(51) Int. Cl.
| | |
|---|---|
| *H04M 3/00* | (2006.01) |
| *H04M 5/00* | (2006.01) |
| *H04L 12/66* | (2006.01) |
| *H04M 3/30* | (2006.01) |
| *H04M 3/54* | (2006.01) |
| *H04L 65/1069* | (2022.01) |
| *H04M 7/00* | (2006.01) |
| *H04L 65/1104* | (2022.01) |

(52) U.S. Cl.
CPC ........ *H04M 3/304* (2013.01); *H04L 65/1069* (2013.01); *H04L 65/1104* (2022.05); *H04M 3/54* (2013.01); *H04M 7/006* (2013.01)

(58) Field of Classification Search
CPC .. H04M 7/006; H04M 3/2227; H04M 7/0084; H04M 3/2236; H04M 3/323; H04M 7/126; H04L 67/10; H04L 43/50; H04L 65/80; H04L 65/1006; H04L 43/0811; H04L 43/087; H04L 43/0852; H04L 43/0829; H04L 43/0864; H04L 43/10; H04L 41/5009
USPC ................ 370/332, 352, 241, 248, 356, 253
See application file for complete search history.

(56) References Cited

U.S. PATENT DOCUMENTS

| | | | |
|---|---|---|---|
| 8,418,000 B1 * | 4/2013 | Salame | H04L 67/10 714/26 |
| 2002/0150086 A1 * | 10/2002 | Bailey | H04L 65/4007 370/352 |

(Continued)

*Primary Examiner* — Kharye Pope (57) ABSTRACT

Remote on-demand site link testing is provided. A site link tester (SLT) system includes an SLT connected to a customer's VoIP phone system. The SLT is configured to communicate with a front end client application operating remotely on a user's computing device. The packet-capture application receives instructions from the client application to perform a packet capture in association with the SLT's network interface and/or to operate as an emulated VoIP endpoint and conduct a test call (e.g., to confirm the customer's VoIP system's compliance with 911-associated legislation or to troubleshoot a VoIP issue). Results of the packet capture may be sent to the client application and analyzed for remotely diagnosing and troubleshooting VoIP-related problems. Using the SLT system, the technician is enabled to perform 911-associated legislation compliance and diagnose VoIP issues on-demand from a remote location, which can reduce or eliminate the need for a technician to be on-site.

16 Claims, 6 Drawing Sheets

(56) References Cited

U.S. PATENT DOCUMENTS

| | | | | |
|---|---|---|---|---|
| 2004/0064760 | A1* | 4/2004 | Hicks | H04L 41/5009 |
| | | | | 714/43 |
| 2004/0193709 | A1* | 9/2004 | Selvaggi | H04L 43/50 |
| | | | | 709/224 |
| 2005/0083911 | A1* | 4/2005 | Grabelsky | H04Q 3/0025 |
| | | | | 370/395.5 |
| 2006/0067237 | A1* | 3/2006 | Burns | H04M 3/304 |
| | | | | 370/352 |
| 2006/0193447 | A1* | 8/2006 | Schwartz | H04M 1/2535 |
| | | | | 379/49 |
| 2006/0277051 | A1* | 12/2006 | Barriac | H04L 65/80 |
| | | | | 704/503 |
| 2007/0019559 | A1* | 1/2007 | Pittelli | H04L 43/065 |
| | | | | 370/352 |
| 2008/0239971 | A1* | 10/2008 | Miyakawa | H04L 43/50 |
| | | | | 370/248 |
| 2008/0254790 | A1* | 10/2008 | Baldridge | H04M 3/5116 |
| | | | | 455/424 |
| 2009/0219822 | A1* | 9/2009 | Variyath | H04W 24/06 |
| | | | | 370/245 |
| 2010/0020715 | A1* | 1/2010 | Monaco | H04L 43/0888 |
| | | | | 370/252 |
| 2010/0329130 | A1* | 12/2010 | Paine | H04L 65/80 |
| | | | | 370/252 |
| 2014/0140223 | A1* | 5/2014 | Yang | H04W 36/0088 |
| | | | | 370/252 |

* cited by examiner

SITE LINK TESTER VIA UNIQUE PHONE EMULATION

CROSS-REFERENCE TO RELATED APPLICATIONS

This application claims the benefit of U.S. Provisional Application No. 63/004,881, having the title of "SITE LINK TESTER VIA UNIQUE PHONE EMULATION" and the filing date of Apr. 3, 2020, which is incorporated herein by reference in its entirety.

BACKGROUND

Voice over Internet Protocol (VoIP) is a technology that is increasingly being used for voice, data, video, and audio communications sessions. Currently, to troubleshoot VoIP-related issues (e.g., call signaling or network conditions) that affect VoIP, a VoIP service provider technician may be required to go to the customer's site to conduct test calls and to diagnose and troubleshoot the issue. As can be appreciated, this can be costly for the VoIP provider in terms of travel time, technician hours, and monetary costs associated with travelling to the customer's site, and may be inconvenient for the customer. Additionally, while waiting for the technician to make an on-site visit, the customer may experience service outages. Additionally, in some examples, to place test calls from the customer's VoIP system, the technician may be further required to lease a softphone license from the customer, which can further prolong diagnosing VoIP issues.

In some examples, as part of setting up new VoIP service at a customer site, one or more test calls to a Public Safety Answering Point (PSAP) from a VoIP endpoint may be required for verifying the VoIP system's compliance with 911-associated legislation (e.g., direct 911 dialing, on-site notification capabilities conveyance of a correct dispatchable location). Currently, this may also require the VoIP service provider technician to make one or more on-site visits to conduct the test calls.

It is with respect to these and other general considerations that embodiments have been described. Also, although relatively specific problems have been discussed, it should be understood that the embodiments should not be limited to solving the specific problems identified in the background.

SUMMARY

The disclosure generally relates to systems, methods, and computer readable storage media for providing remote on-demand site link testing. Aspects of a site link tester system described herein include a site link tester (SLT) connected to a Voice over Internet Protocol (VoIP) phone system at a customer's site. In examples, the SLT includes a phone emulation application and a packet-capture application, and the SLT is configured to communicate with a front-end application operating on a user's computing device, which may be remotely located from the SLT (and remotely located from the customer's site). In some examples, the packet-capture application may receive instructions from the front-end application to perform a packet capture process in association with the SLT's network interface. The SLT may further receive instructions from the front-end application to conduct a test call. In some examples, the test call is made to a Public Safety Answering Points (PSAP) for confirming the customer's VoIP system's compliance with 911-associated legislation (e.g., direct 911 dialing, on-site notification capabilities conveyance of a correct dispatchable location). In other examples, the test call is made for troubleshooting a VoIP issue.

The SLT may conduct the test call and, in some examples, capture and log traffic that passes over the connection between the SLT and the test call endpoint. Results of the packet capture may be analyzed for troubleshooting VoIP-related problems, such as call-signaling or network-condition issues that affect VoIP. The SLT may be configured to provide the results to the front-end application, which provides a display of the traffic data to the user. In some examples, the report includes analytics of the traffic data determined by the packet-capture application. Aspects of the disclosure enable the technician to, via the front-end application, utilize the SLT system to conduct a test call, verify 911-associated legislation compliance, verify audio quality of the test call, and view message exchanges associated with the test call for diagnosing VoIP-related problems. The technician is enabled to perform 911-associated legislation compliance and diagnose VoIP issues on-demand from a remote location, which can reduce or eliminate the need for a technician to be on-site (i.e., at the customer's site). Accordingly, by utilizing the SLT system, VoIP service providers may reduce the time associated with diagnosing VoIP service issues, reduce service outages, reduce the number of on-site visits, and reduce technician man hours related to diagnosing and resolving VoIP service problems.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The present disclosure describes a system, method, and apparatus for providing remote on-demand site link testing. As part of providing remote on-demand site link testing, aspects of the present disclosure include a Site Link Tester (SLT) system that is operatively connected to a Voice over Internet Protocol (VoIP) phone system installed at a customer's site. The SLT system includes a backend SLT comprising a phone emulation application and a packet-capture application. The phone emulation application is generally configured to create a virtual demarcation that connects calls to a test call endpoint originating or terminating from a softphone of a front-end application operating on a remote computing device. For example, the remote computing device may be a computing device used by a technician located at a remote site (e.g., service provider site or other remote location). In some examples, the test call is made to a Public Safety Answering Point (PSAP) for confirming the customer's VoIP system's compliance with 911-associated legislation (e.g., direct 911 dialing, on-site notification capabilities conveyance of a correct dispatchable location).

The packet-capture application is generally configured to intercept and log traffic that passes over the connection between the phone emulation application and the test call endpoint responsive to a command by the technician (via the front-end application). Results of the packet capture may be analyzed for troubleshooting the VoIP network. For example, packets that are sent between the phone emulation application and the test call endpoint may be analyzed for identifying VoIP-related problems, such as call signaling or network conditions issues that affect VoIP. The SLT may be configured to provide the results to the front-end application, which provides a display of the traffic data to the technician. In some examples, the report includes analytics of the traffic data determined by the packet-capture application.

Aspects of the disclosure enable the technician to, via the front-end application, utilize the SLT system to conduct a test call, verify 911-associated legislation compliance, verify audio quality of the test call, and view message exchanges associated with the test call for diagnosing VoIP-related problems. The technician is enabled to perform 911-associated legislation compliance and diagnose VoIP issues on-demand from a remote location, which can reduce or eliminate the need for a technician to be on-site (i.e., at the customer's site). Moreover, the phone emulation application of the SLT may be registered with the local VoIP provider. Accordingly, aspects of the SLT system may be used by the user to diagnose VoIP issues and perform 911 compliance without requiring the user to lease a softphone license from the customer. Accordingly, by utilizing the SLT system, VoIP service providers may reduce the time and cost associated with diagnosing VoIP service issues, reduce service outages, reduce the number of on-site visits, and reduce technician man hours related to diagnosing and resolving VoIP service problems.

Figure 1:
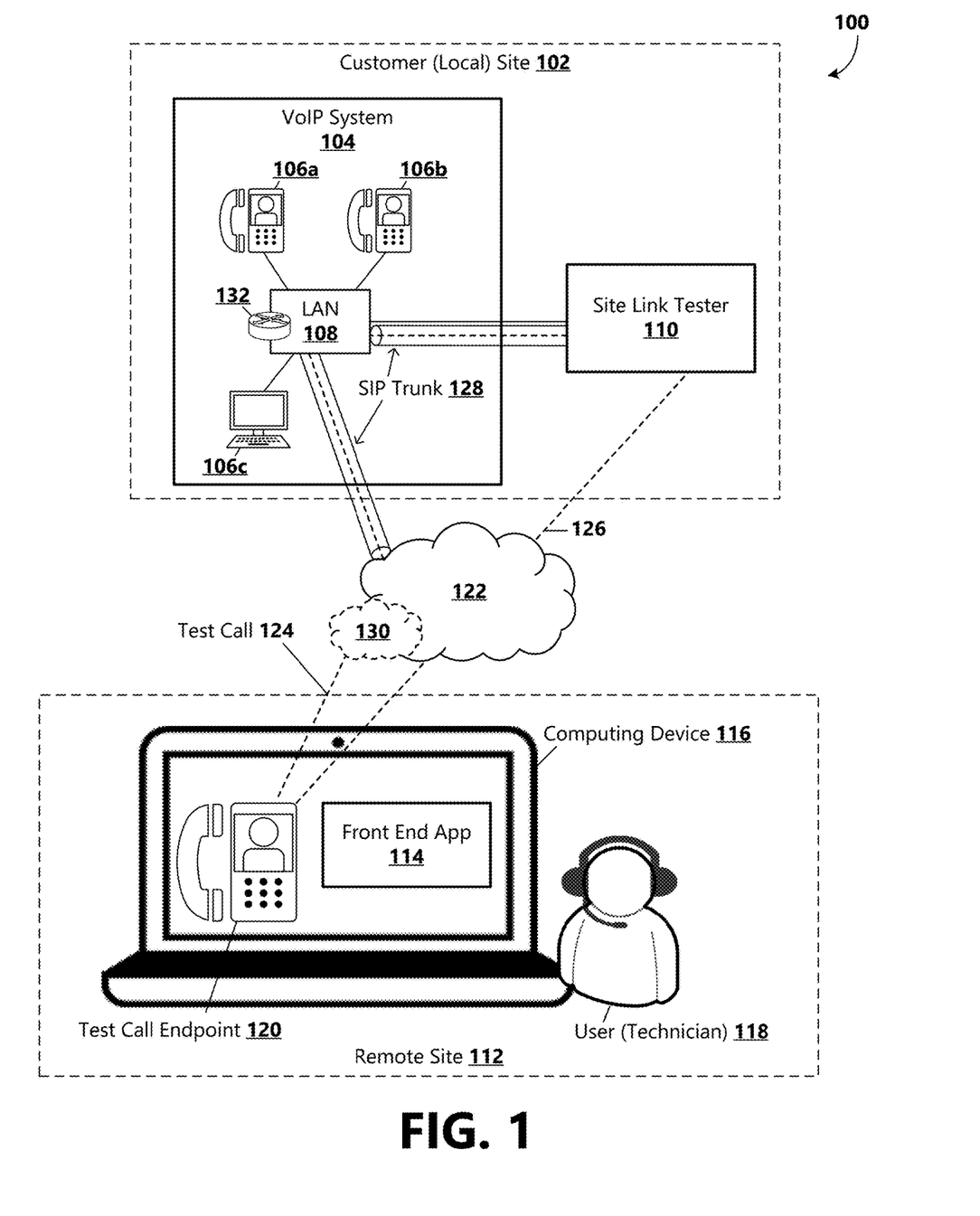
FIG. 1 is a block diagram of an example environment in which a system of the present disclosure can be implemented.

FIG. 1 is a block diagram of an example environment 100 in which an SLT system of the present disclosure can be implemented. For example, the environment 100 may include an SLT system customer (local) site 102, a remote site 112, and a test call endpoint 120, one or more of which may be communicatively connected via a network 122 and/or a PSTN network 130. As illustrated, the example environment 100 includes the SLT system 110 operatively connected to a VoIP system 104 at a customer (local) site 102. The customer site 102 may be one of a plurality of customer sites 102 to which a particular VoIP service provider may provide Internet Protocol (IP) telephony services. For example, the VoIP service provider may provide a communications medium that connects the VoIP system 104 to an IP network 122. In some examples, the communications medium includes a Session Initiation Protocol (SIP) trunk 128 that uses the SIP standard for signaling and for handling voice, video, and other multimedia sessions. As should be understood, although examples of the communications medium are described herein as an SIP trunk 128, other types of IP communications protocols for signaling and voice sessions may be used in example aspects. For example, the communications medium may be implemented as an H.323 trunk configured to use the H.323 standard for signaling and voice sessions. Other IP communications protocols are possible and are within the scope of the present disclosure.

The VoIP system 104 may include a plurality of VoIP endpoints 106a-c (generally 106) that are connected to a local area network 108. Although three VoIP endpoints 106a-c are illustrated, it will be understood that more or fewer endpoints are possible. The plurality of VoIP endpoints 106 can include hardware-based and/or software-based telephones that are configured to use VoIP technology to send and receive phone calls over an IP network 122. For example, the VoIP endpoints 106 may be operative to convert analog telephone audio into a digital format that can be transmitted over the Internet (IP network 122) and convert incoming digital phone signals from the Internet to standard telephone audio. When an outbound call is made to a target endpoint with a Public Switched Telephone Network (PSTN) number, the call may be transmitted through an exchange to a PSTN network 130 for connecting with the target endpoint.

According to an aspect, the SLT 110 is illustrative of a software application, module, or computing device operative or configured to operate as or emulate a VoIP endpoint 106 in the VoIP system 104 at the customer site 102 and provide, to a remote front-end application 114, an interface to the VoIP system 104. Effectively, this allows the SLT 110 to be treated as another endpoint 106 of the VoIP system 104. As such, from a customer perspective, implementation of the SLT 110 requires only that an administrator of the VoIP system 104 add the SLT 110 as an endpoint 106. The SLT 110 may be configured to establish a communication session 126 with the front-end application 114 operating on a remote computing device 116, wherein the communication session 126 enables the front-end application 114 to control a test call 124 between the SLT 110 and a test call endpoint 120, provide a frontend for the SLT that allows a user 118 of the front-end application 114 to communicate with a user of the test call endpoint 120 and/or to verify audio quality of the test call 124, capture and receive traffic data (e.g., packet capture data) associated with the test call 124, and terminate the test call 124. For example, the user 118 of the front-end application 114 may be a technician servicing or setting up service and connectivity for the VoIP system 104 at the customer site 102. In some examples, the user 118 may be located at a VoIP service provider site or other remote site 112.

In one embodiment, the SLT 110 is implemented as a dedicated hardware device. For example, the SLT 110 may comprise at least one processor and memory including instructions that when executed by the at least one processor are configured to perform functions as described herein for providing on-demand remote SIP trunk 128 diagnostics. In another embodiment, the SLT 110 is implemented in another device 132, such as in a router, server, virtual server, or other device connected to the LAN 108. For example, the SLT 110 may be implemented as a software application that can be executed by a computing device that includes sufficient computer executable instructions that, when executed, are operative or configured to perform functions as described herein for providing on-demand remote link testing. In another embodiment, the SLT 110 is implemented as a system-on-a-chip (SoC). The SLT 110 may be connected to the VoIP system 104 via a LAN 108 connection.

The front-end application 114 may be implemented as a thick client application, which may be stored locally on the computing device 116, or implemented as a thin client application (i.e., web application) that may reside on a remote server and be accessible over a network or combination of networks (e.g., IP network 122, the Internet, wide area networks, local area networks, software defined networks). The computing device 116 may be one or more of various types of computing devices (e.g., a server device, a desktop computer, a tablet computing device, a mobile device, a laptop computer, a laptop/tablet hybrid computing device, a large screen multi-touch display, or other type of computing device) configured to execute instructions for performing a variety of tasks. Example hardware of these computing devices 116 is discussed in greater detail in regard to FIG. 5.

In some examples, the user 118 may use the front-end application 114 to view traffic data for diagnosing a VoIP service issue, such as unconnected calls, disconnected calls, and quality issues (e.g., latency, jitter, packet loss). In other examples, the user 118 may use the front-end application 114 to verify that a VoIP endpoint 106 in a customer's VoIP system 104 is compliant with Kari's Law and Ray Baum's Act. For example, Kari's Law requires implementation of direct 911 dialing and on-site notification capabilities in multi-line telephone systems (MLTS), and Ray Baum's Act requires that a dispatchable location is conveyed with 911 calls so that a PSAP will receive the caller's location automatically and can dispatch responders more quickly. The dispatchable location may be defined as a street address of the calling party, and additional information such as room number, floor number, or similar information necessary to adequately identify the location of the calling party. As part of complying with Kari's Law and Ray Baum's Act, when setting up VoIP services at the customer's site 102, one or more test calls may be conducted with a PSAP to verify that a VoIP endpoint 106 in the customer's VoIP system 104 is able to direct-dial 911 and that an accurate dispatchable location is conveyed with the test call. As mentioned previously, without implementation of the SLT system, a technician may have to make multiple (e.g., 3-4) trips to the customer site 102 to conduct the 911 test calls from the customer site 102. When the SLT system is implemented, the user 118 may use the front-end application 114 to initiate a test call 124 between the SLT 110 and a PSAP (test call endpoint 120) and verify that the 911 call operator at the PSAP receives accurate dispatchable location information associated with the location of the SLT 110. Aspects of the SLT system are described in further detail below.

Figure 2:
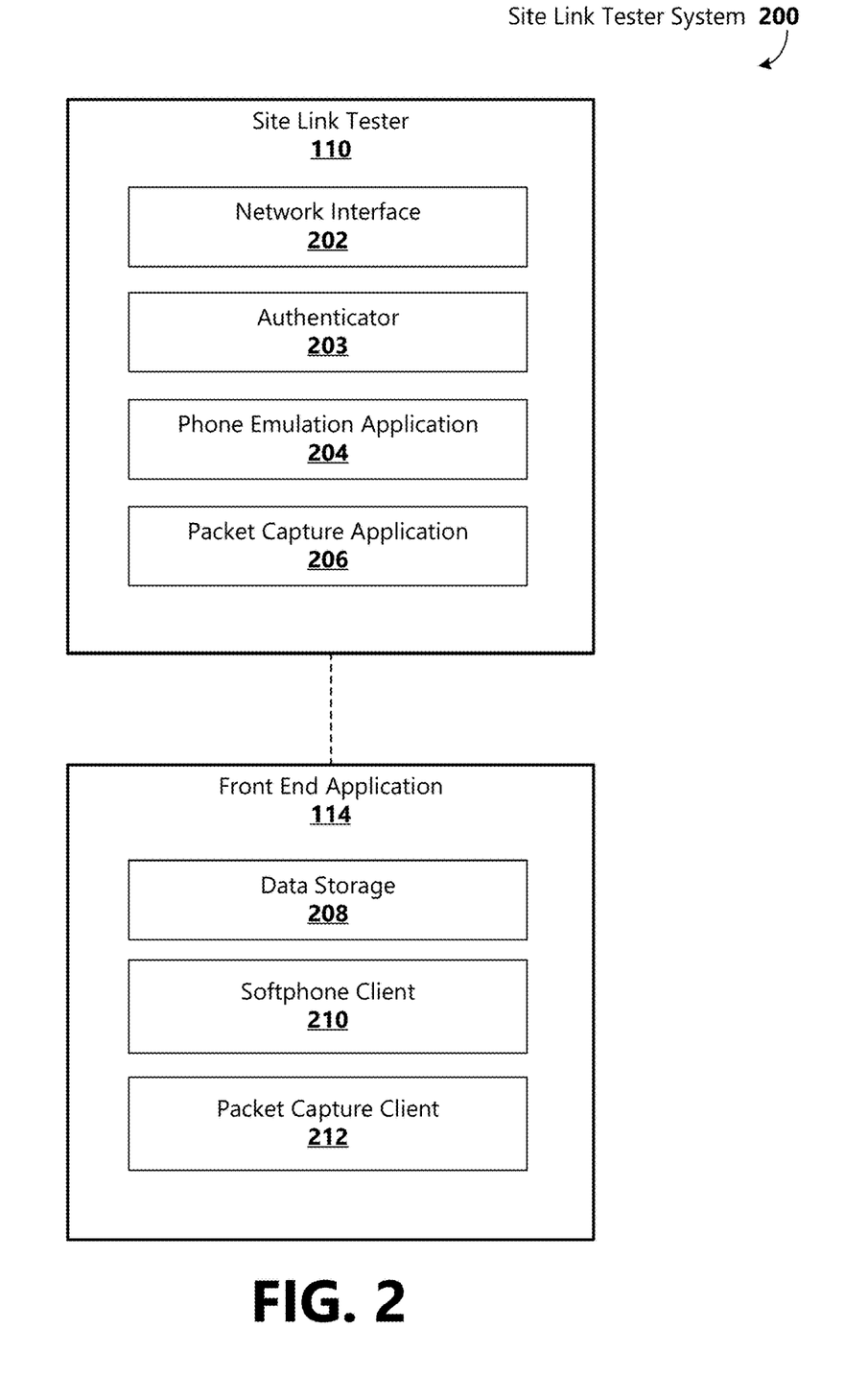
FIG. 2 is a block diagram of an example embodiment of the Site Link Tester system.

FIG. 2 is a block diagram of an example embodiment of the SLT system 200, wherein various example components of the SLT system 200 are described with reference to FIG. 2. As should be understood by those skilled in the art, one or more of the components included in the SLT system 200 can be integrated or provided in any combination of separate systems, wherein FIG. 2 shows only one example. As illustrated, the SLT system 200 includes the SLT 110, which may operate at the customer site 102, and the front-end application 114, which may operate remotely on a computing device 116 at the VoIP service provider site 112 or at another remote location.

According to an aspect, the SLT 110 includes a network interface 202, an authenticator 203, a phone emulation application 204, and a packet-capture application 206. As described above, the SLT 110 may be a dedicated hardware device, a SoC, or a software application that can be executed by the user's computing device 116. The network interface 202 of the SLT 110 is illustrative of an Ethernet port that is configured to connect the SLT 110 to the customer's LAN 108, the VoIP system 104, and the SIP trunk 128. In some examples, the network interface 202 is a Gigabit Ethernet port. According to an aspect, the SLT 110 may be registered as a VoIP endpoint 106 of the VoIP system 104 and comprises an IP address.

The user 118, who may be a telecommunications/VoIP provider technician located at a remote site 112, may wish to log into the SLT 110 at the customer site 102 to remotely troubleshoot a VoIP issue or to remotely verify direct 911 dialing and dispatchable location compliance. Accordingly, the front-end application 114 of the SLT system 200 may be executed on the user's computing device 116, which may provide a user interface (UI) for enabling the user 118 to select a particular customer site or a particular SLT 110 to log into. In various examples, the user's identity may be authenticated to use the front-end application 114. The UI may include a listing of customers in a directory of customers that may be searched for a particular customer or particular SLT 110. The user 118 may enter the IP address of the SLT 110 or select the particular customer/customer site from the listing. The front-end application 114 may use the IP address associated with the SLT 110 to log into the SLT 110 to establish a secure communication session 126 via which the front-end application 114 can control SLT functions and emulate a VoIP endpoint 106 presence at the customer site 102. In some examples, the communication session 126 includes an SIP communication session.

In some examples, as part of logging into the SLT 110, the user 118 may be prompted to provide user credentials or a token that may be provided to the SLT 110 and used to verify the user's identity and to enable functions that the user 118 is permitted to utilize. In some examples, the SLT 110 includes an authenticator 203 configured to receive a login request from the front-end application 114, confirm the identity of the user 118 of the front-end application 114 using one or more authentication techniques, and responsive to successful authentication of the user 118, determine user privileges associated with the SLT 110 and establish the secure communication session 126 between the SLT 110 and the front-end application 114 for enabling the user 118 to, based on the user's privileges, access a data storage 208 and one or more functions of the SLT 110, such as phone emulation functionalities and packet capture functions.

According to an aspect, the front-end application 114 includes a softphone client 210 that, when the front-end application 114 is logged into the SLT 110, is configured to control the phone emulation application 204 of the SLT 110 to make and receive VoIP calls. For example, the user 118 can use the softphone client 210 to make a test call 124 between the phone emulation application 204 of the SLT 110 and a test call endpoint 120. For enabling the user 118 to make the test call 124, the softphone client 210 may include a phone UI via which the user 118 may enter a phone number or IP address of a test call endpoint 120 and select to instruct the phone emulation application 204 to initiate the call. For example, via the secure communication session 126 between the front-end application 114 and SLT 110, the entered phone number or IP address of the test call endpoint 120 and instructions to call the test call endpoint 120 are sent to and received by the phone emulation application 204 of the SLT 110.

In some examples, the phone emulation application 204 may operate as an SIP user agent and use SIP signaling packets to establish or set up an SIP link (i.e., channel or session) to the test call endpoint 120. In some examples, the phone emulation application 204 may be configured to operate as, and provide functions of, a particular type and model of VoIP endpoint. One non-limiting example is an Avaya® 96xx IP phone. The phone emulation application 204 of the SLT 110 may be configured to receive the instructions and phone number or IP address of the target test call endpoint 120 and use the received phone number or IP address to send an invitation to communicate with the test call endpoint 120. When a communication session for the test call 124 is established using an agreed-upon protocol (e.g., SIP, H.323, other protocol), an SIP link associated with the test call 124 may be established. In some examples, the secure communication session 126 between the front-end application 114 and the SLT 110 includes an SIP link via which the user 118, using a headset or speaker included in or operatively connected to the computing device 116, can verify audio quality of the test call 124 (e.g., for determining network conditions associated with the test call 124) and/or use a microphone included in or operatively connected to the computing device 116 to converse with a user of the test call endpoint 120. For example, effects of network quality may be heard in the audio, wherein network conditions that may affect VoIP may include latency, jitter, and packet loss.

According to an aspect, the front-end application 114 operating on the user's computing device 116 further comprises a packet capture client 212 configured to provide instructions to the packet-capture application 206 included in the SLT 110 to perform a packet capture process in association with the test call 124 and to provide a UI for display on the user's computing device 116 that includes packet capture function controls and is configured to display traffic data obtained via the packet capture process. In some examples, the packet capture function controls provided in the packet capture UI may include controls to initiate a packet capture, end the packet capture, and view metrics associated with the packet capture. In some examples, the packet capture function controls may further include controls to schedule a packet capture and to store, print, and send an SIP call message flow and associated packet capture metrics, print packet capture metrics, etc.

In some examples, the packet capture UI may be streamlined to present limited packet capture options to the user 118, such as packet capture options related to SIP traffic being sent and received via the SLT's network interface 202. Limiting packet capture to traffic sent and received via the SLT's network interface 202 is advantageous in that a customer is more likely to permit the SLT to connect to its network if it is assured that the SLT is permitted visibility only into the traffic generated for testing purposes rather than all traffic on the customer's systems. That is, for increased security, the packet-capture application 206 may be configured to detect, capture, and save SIP packets that traverse the SLT's network interface 202, either inbound or outbound, rather than to operate promiscuously, where traffic exchanged between other devices on the LAN 108 may be examined. Accordingly, in some examples, options associated with capturing packets of other protocol types (e.g., other than SIP) and of other interfaces may not be included in the streamlined or simplified packet capture UI. The simplified packet capture UI may enable novice technicians to utilize the packet capture client 212 for remotely diagnosing or confirming 911 compliance of a customer's VoIP system 104. As can be appreciated, by enabling novice technicians to remotely diagnose or confirm 911 compliance of a customer's VoIP system 104, technician training can be reduced and skillsets of VoIP provider employees may be optimized. For example, expert technicians may be enabled to focus on performing other tasks that may require more expertise or skill and novice technicians may be enabled to perform SLT-enabled tasks that may have previously been performed by more skilled and experienced technicians.

According to an aspect, the packet-capture application 206 may be configured to receive instructions from the packet capture client 212 to start a packet capture and, in response to the instructions, collect and decode SIP packets associated with traffic sent and received via the SLT's network interface 202. For example, the packet-capture application 206 may receive instructions from the packet capture client 212 to collect and decode SIP packets associated with the test call 124 initiated by the softphone client 210 of the front-end application 114 operating remotely on the user's computing device 116. In some examples, the phone emulation application 204 may make the test call 124 in response to receiving an indication of the packet-capture application 206 receiving instructions from the packet capture client 212 to start the packet capture. The packets may be collected and decoded so that the raw data they carry can be viewed and analyzed.

According to an aspect, the packet-capture application 206 may be further configured to transmit the packet capture data to the packet capture client 212. In some examples, the packet capture client 212 is configured to receive and display the packet capture data in real time or near-real time as each SIP packet associated with the test call 124 is sent to or from the SLT 110. In some examples, the packet-capture application 206 and/or packet capture client 212 are further configured to process the packet capture data. For example, processing the packet capture data may include determining whether a packet has an error, such as a late packet, a missing packet, or a packet delivered out of order. An indication of a packet error, such as a message, color coding, or other indicator, may be displayed in the packet capture UI.

In some examples, the packet-capture application 206 may be configured to analyze Real-time Transfer Protocol (RTP) streams. For example, an RTP packet stream carrying voice data packets may be analyzed and various metrics may be determined and displayed in the packet capture UI. Examples of RTP data and RTP metrics that may be included in the packet capture UI include a packet number and a sequence number, arrival time, delay, jitter, packet size, an indication of a lost packet, etc. In some examples, the packet-capture application 206 may be further configured to store the packet capture data in the data storage 208, which may be local to the SLT 110 or remotely located (e.g., on a server). In some examples, the packet-capture application 206 may be configured to perform additional and/or alternative packet capture functions.

According to an aspect, the implementation and utilization of the SLT system 200 may be enable the user 118 to remotely view and analyze the data as part of troubleshooting a VoIP issue. As should be appreciated, this can reduce or eliminate the need for a technician to be at the customer's site 102 to diagnose VoIP service issues. Accordingly, the SLT system 200 can reduce the time associated with diagnosing VoIP service issues, reduce service outages, reduce the number of truck rolls, reduce technician man hours related to diagnosing and resolving VoIP service problems, and other related benefits.

Figure 3A:
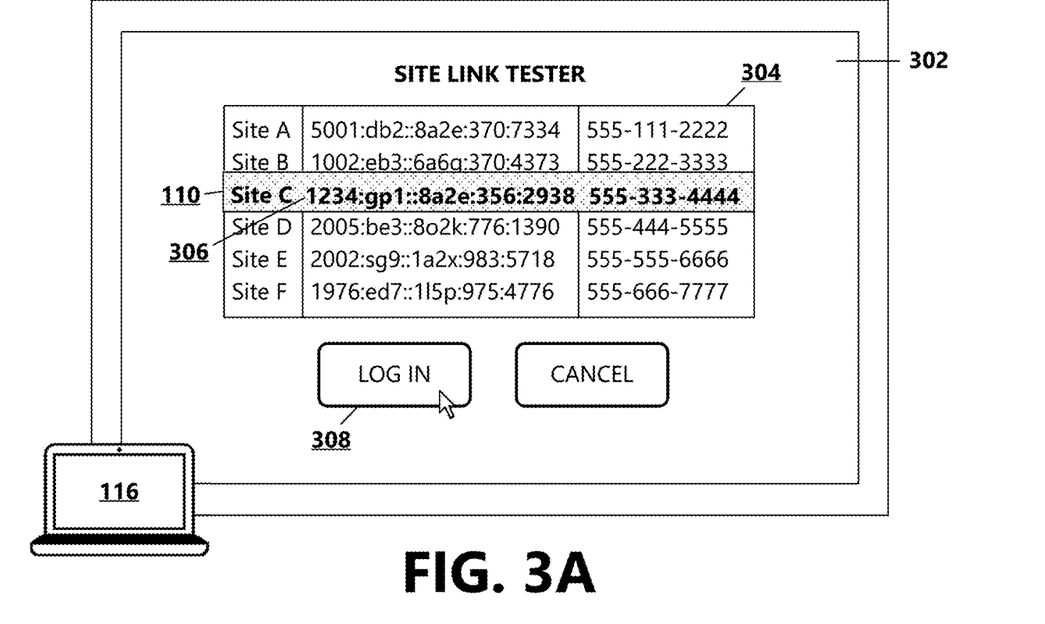
FIG. 3A is an illustration of an example user interface provided by a front-end application of the Site Link Tester system.

With reference now to FIGS. 3A-D, examples of UIs and UI features that may be displayed to the user 118 are illustrated. FIG. 3A includes an example of a front-end application UI 302 that may be displayed on the user's computing device 116. In some examples and as illustrated, the front-end application UI 302 may include a listing of customers in a directory 304 that may be searched for a particular customer or particular SLT 110. The user 118 may enter or select the IP address 306 of the SLT 110 or select the particular customer/customer site from the listing. In response to a selection to log in (e.g., via a selection of a log in command 308), The front-end application 114 may use the IP address 306 associated with the SLT 110 to log into the SLT 110 to establish a secure communication session 126 via which the front-end application 114 can control SLT functions and emulate a VoIP endpoint presence at the customer site 102.

Figure 3B:
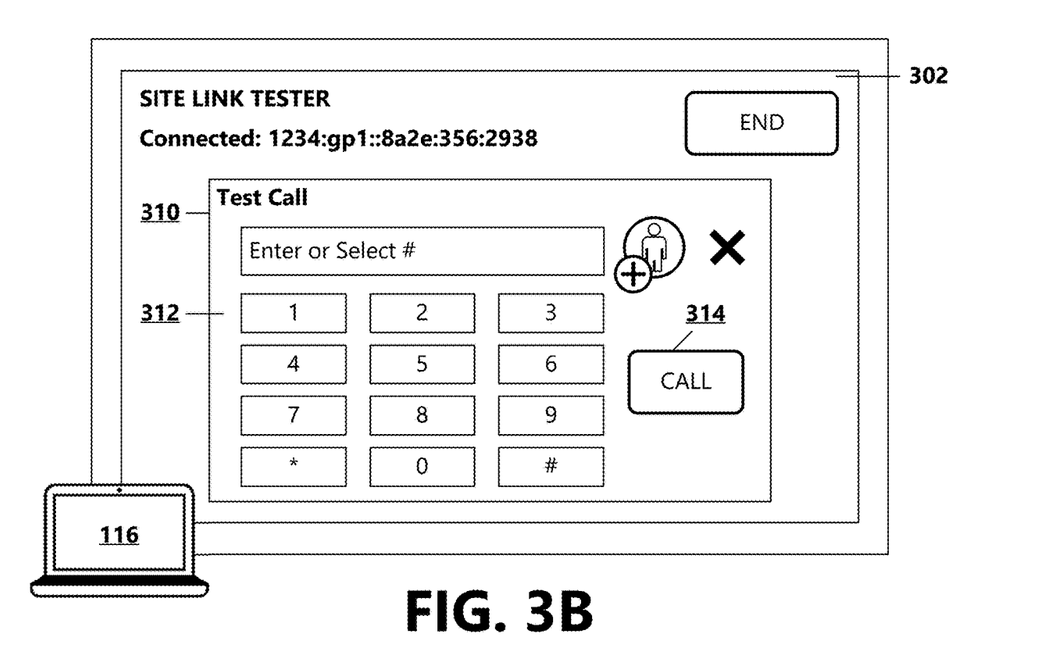
FIG. 3B is an illustration of another example user interface provided by a front-end application of the Site Link Tester system.

As illustrated in FIG. 3B, when the front-end application 114 is logged into the SLT 110, a softphone UI 310 may be provided and displayed in the front-end application UI 302. For example, the softphone UI 310 may include a keypad 312 and/or field that enables the user 118 to enter a phone number or an IP address of a test call endpoint 120 and a function control 314 that enables the user 118 to select to initiate the test call 124 with the test call endpoint 120. According to an aspect, when the user 118 selects to initiate the test call 124, the softphone client 210 may instruct the phone emulation application 204 to initiate the call.

Figure 3C:
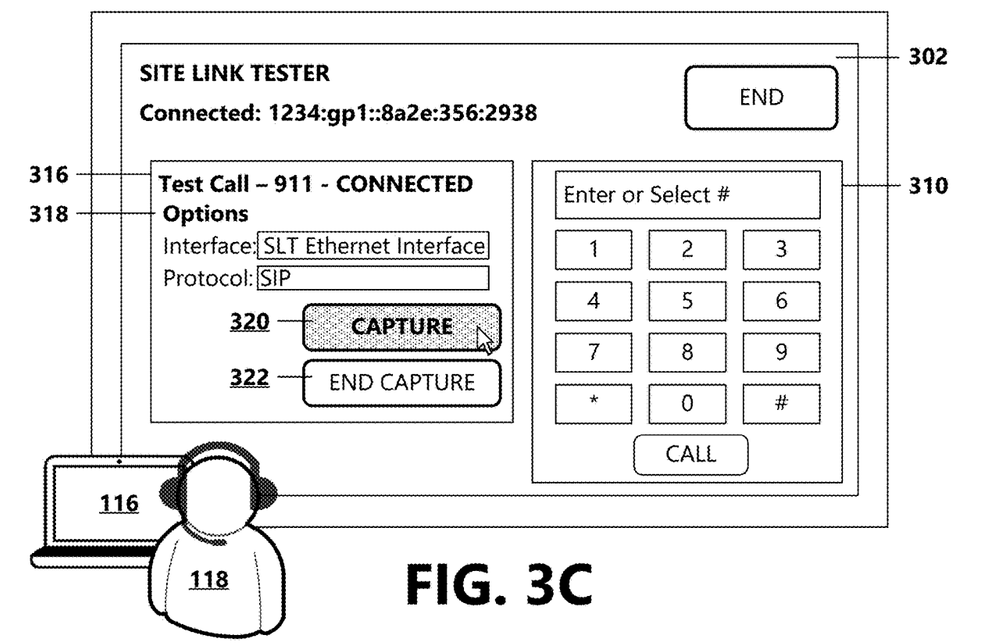
FIG. 3C is an illustration of another example user interface provided by a front-end application of the Site Link Tester system.

As described above, as part of troubleshooting a VoIP system 104, the user 118 may wish to capture and view the SIP call message flow of a test call 124. In some examples and as illustrated in FIG. 3C, the front-end application 114 is configured to provide a packet capture client 212 and a packet capture UI 316. For example, the packet capture UI 316 may be displayed in the front-end application UI 302 and may include various function controls that enable the 118 to select to select options associated with a packet capture. For example, via one or more options controls 318, the user 118 may be enabled to specify a start or end time for the packet capture, a length of time for the packet capture, an amount of data to capture, etc. In some examples, the one or more options controls 318 may include an option for enabling the user 118 to select particular packet types to capture. In some examples, the function controls may include a capture control 320 that, when selected, initiates the packet capture, and an end capture control 322 that, when selected, terminates the packet capture. Additional function controls may be included in the packet capture UI 316 and are within the scope of the present disclosure. In some examples, the packet capture UI 316 may include the softphone UI 310. For example, the softphone UI 310 may be displayed when or after a packet capture is initiated for enabling the user 118 to initiate a test call 124 and to capture packets exchanged in association with the test call 124. In examples, the front-end application UI 302 may also permit a user of the front-end application to set a future or periodic time to capture and stop capturing packets, as needed. The captured packet information can then be stored and later viewed by a user to diagnose any issues.

Figure 3D:
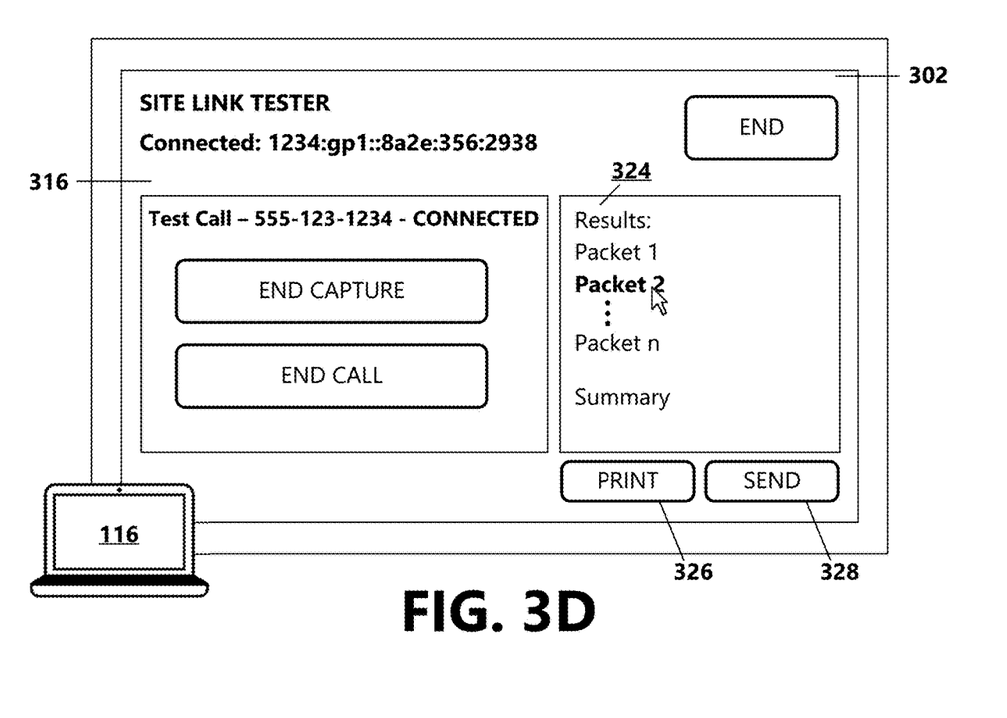
FIG. 3D is an illustration of another example user interface provided by a front-end application of the Site Link Tester system.

According to an aspect, the packet-capture application 206 may be configured to generate packet capture results 324 associated with the packet capture, when may be received by the packet capture client 212 and displayed in the packet capture UI 316 as illustrated in FIG. 3D. For example, the packet capture results 324 may include the SIP call message flow (e.g., a listing of the packets exchanged) in association with the test call 124 and may further include analysis data, metrics, and summarized data. In some examples, the packet capture results 324 include an indication (e.g., message, color coding, or other indicator) of whether a packet has an error, such as a late packet, a missing packet, or a packet delivered out of order. In some examples, the user 118 may be enabled to select a packet listed in the packet capture results 324 to view additional details. In some examples, the packet capture UI 316 further includes various function controls, such as a print function control 326 to print the SIP call message flow, a send function control 328 to send the SIP call message flow, and other controls. As should be appreciated, the example UIs described above are not meant to limiting, but are examples of various function controls and diagnostic information that can be provided by the SLT system 200. Other UI types, functions, and information may be provided and are within the scope of the present disclosure.

Figure 4:
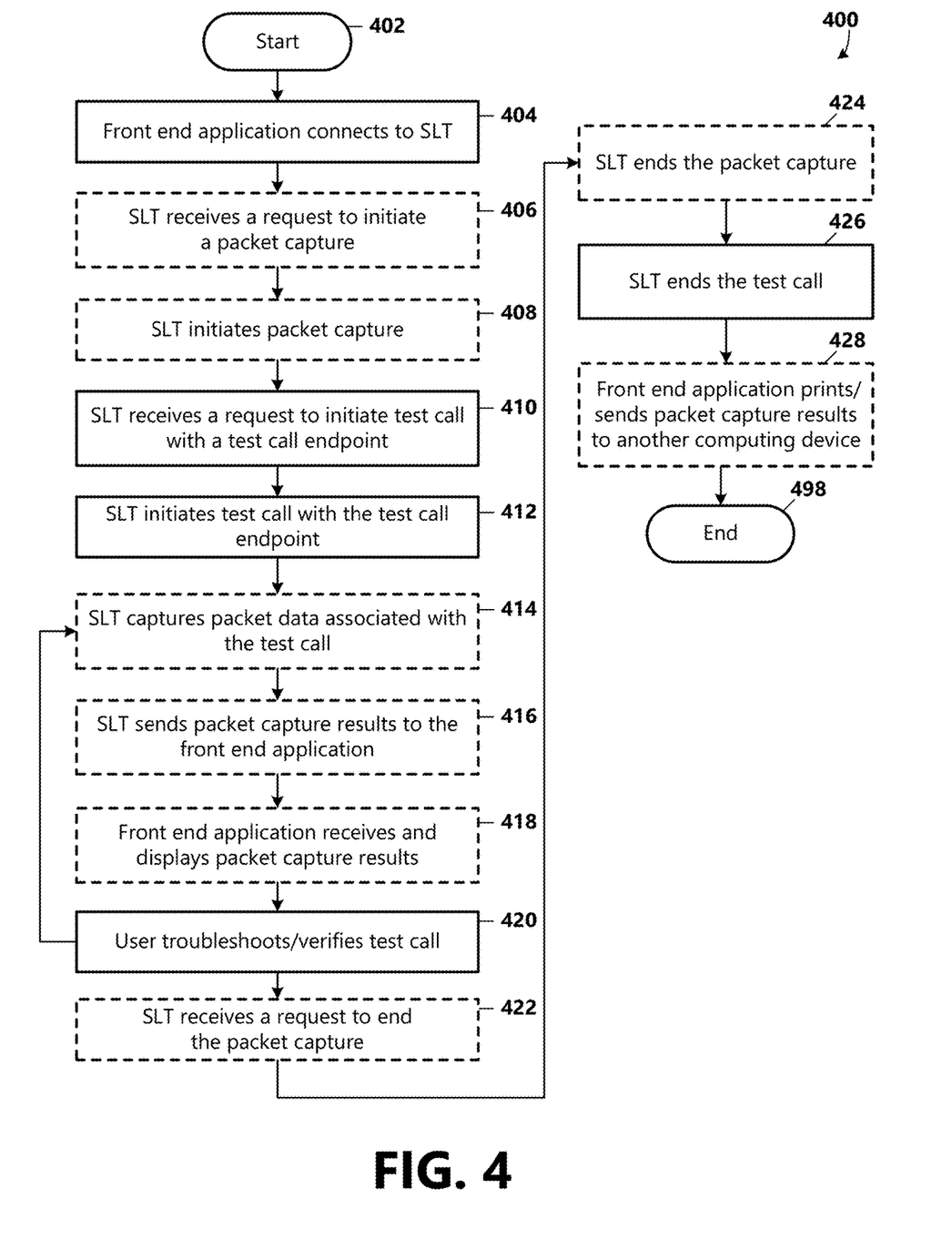
FIG. 4 is a flow diagram depicting general stages of an example process for providing remote on-demand site link testing according to an embodiment.

FIG. 4 is a flow diagram depicting general stages of an example process for providing remote on-demand site link testing according to an embodiment. With reference now to FIG. 4, operations that are illustrated with a dashed line represent operations that are associated with an optional packet capture process. The method 400 starts at START OPERATION 402 and proceeds to OPERATION 404, where a connection is established with an SLT. For example, the front-end application 114 operating on a user's computing device 116 may log in or establish a connection 126 with the SLT 110 connected to a customer's LAN 108. For example, the user 118 may be a technician troubleshooting an issue associated with the customer's VoIP system 104 or verifying the customer's VoIP system's compliance with 911 laws (e.g., Kari's Law and Ray Baum's Act). In some examples, an authentication process is performed to verify the user's identity and permissions prior to logging the front-end application 114 into the SLT 110. According to an aspect, when the front-end application 114 is logged into the SLT 110, the front-end application 114 is configured to control the phone emulation application 204 and packet-capture application 206 of the SLT 110.

At (optional packet capture process) OPERATION 406, a request to initiate a packet capture is received. For example, the SLT 110 may receive a request from the front-end application 114 to initiate a packet capture. In some examples, the user 118 may use the packet capture UI 316 to select options associated with the packet capture and to select to initiate the packet capture, which are communicated to the SLT 110.

At (optional packet capture process) OPERATION 408, the packet capture may be initiated. For example, the SLT 110 may use the packet-capture application 206 to initiate the pack capture to detect, capture, and save inbound and outbound SIP packets that traverse the SLT's network interface 202. OPERATION 408 may be initiated, for example, when the SLT 110 receives a command to initiate packet capture from the front-end application 114.

At OPERATION 410, a test call 124 with a test call endpoint 120 may be initiated. For example, the SLT 110 may receive a request from the front-end application 114 to initiate a test call 124 with a test call endpoint 120. In some examples, the test call request is received as part of or after the packet capture request.

At OPERATION 412, the test call 124 may be initiated with the test call endpoint 120. For example, the SLT 110 may use the phone emulation application 204 to initiate the test call 124 with the test call endpoint 120 based on a command received from the softphone client 210 of front-end application 114.

At (optional packet capture process) OPERATION 414, packets traversing the SLT's network interface 202 may be collected and decoded. For example, the SLT 110 may use the packet-capture application 206 to collect and decode packets traversing the SLT's network interface 202 exchanged in association with the test call 124 so that the raw data they carry can be viewed and analyzed.

At (optional packet capture process) OPERATION 416, the packet capture results 324 may be sent to the front-end application 114. For example, the SLT 110 may send the packet capture results 324 to the front-end application 114. In some examples, the SLT 110 transmits the packet capture results 324 data to the packet capture client 212 in real time or near-real time.

At (optional packet capture process) OPERATION 418, the packet capture results 324 may be received and displayed. For example, the front-end application 114 may receive and display the packet capture results 324, where the packet capture client 212 may display the call flow, call analysis information, RTP statistics (e.g., jitter, delay, packet lost), etc. in the packet capture UI 316. In some examples, the packet capture results 324 include an indication (e.g., message, color coding, or other indicator) of an error, such as a late packet, a missing packet, or a packet delivered out of order.

At OPERATION 420, the test call 124 may be troubleshot or the customer's VoIP system's compliance with 911 laws may be verified. In some examples, as part of troubleshooting the test call 124, the user 118 may analyze the packet capture results 324 and/or use a headset or speaker included in or operatively connected to the computing device 116 to verify audio quality of the test call 124 (e.g., for determining network conditions associated with the test call 124). In some examples, as part of verifying the customer's VoIP system's compliance with 911 laws, the user 118 may speak with a PSAP operator to ensure that the correct physical address associated with the SLT 110 is provided to the PSAP operator.

In some examples, OPERATIONS 416-420 may be repeated until, at (optional packet capture process) OPERATION 422, a request to terminate the packet capture may be received. For example, the SLT 110 may receive a request from the packet capture client 212 to terminate the packet capture and, responsive to the request, terminate the packet capture at (optional packet capture process) OPERATION 424.

At OPERATION 426, the test call 124 may be terminated. For example, the SLT 110 may terminate the test call 124. For example, the SLT 110 may terminate the test call 124 based on instructions provided by the softphone client 210.

At (optional packet capture process) OPERATION 428, the packet capture results 324 may be transmitted to another computing devices, stored, printed, etc. For example, the user 118 may select to print, send the packet capture results 324 to another computing device, store the results locally on the user's computing device 116, etc. The method 400 may end at OPERATION 498.

Figure 5:
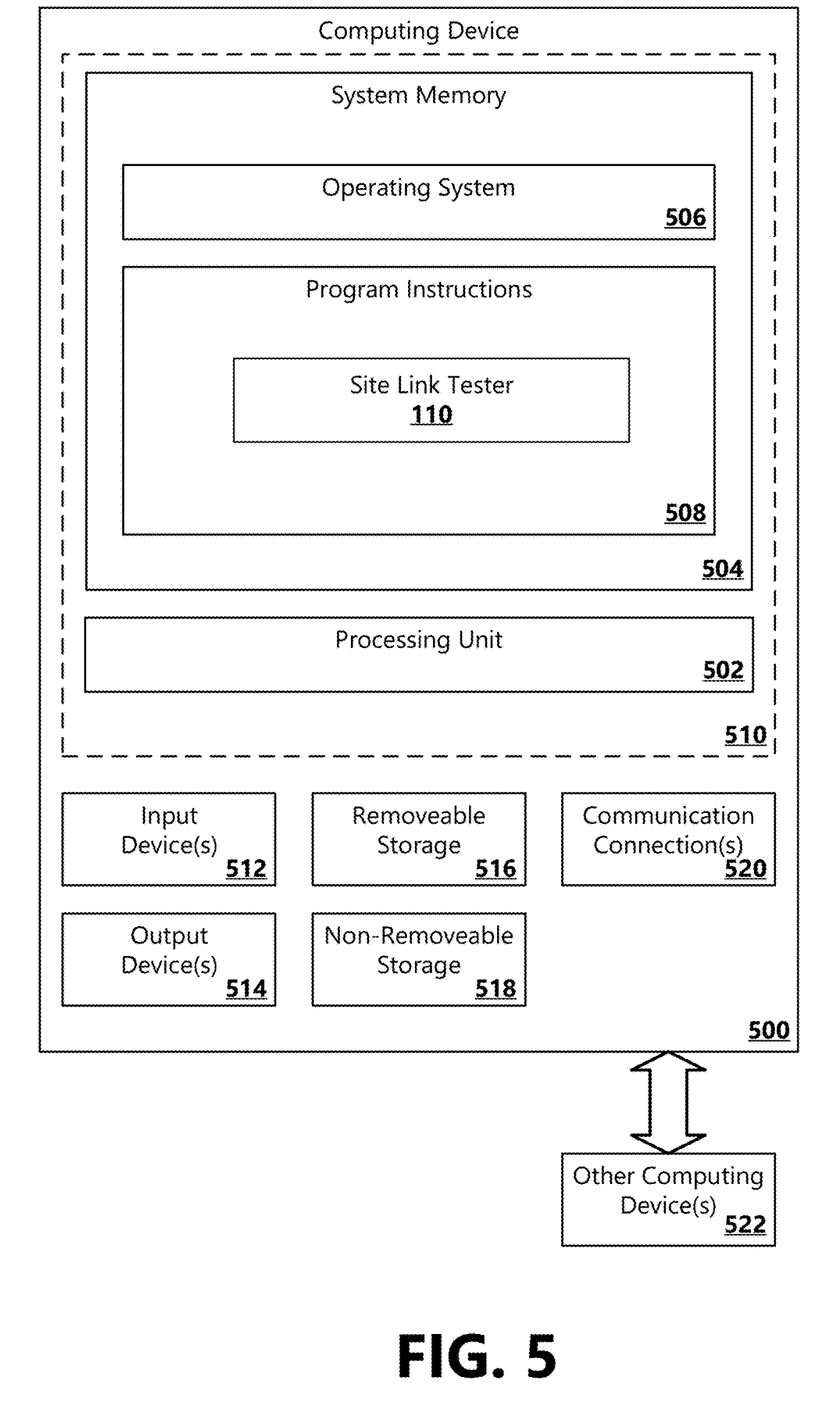
FIG. 5 is a block diagram illustrating example physical components of a computing device or system with which embodiments may be practiced.

FIG. 5 is a block diagram illustrating physical components of an example computing device with which aspects may be practiced. The computing device 500 may include at least one processing unit 502 and a system memory 504. The system memory 504 may comprise, but is not limited to, volatile (e.g. random access memory (RAM)), non-volatile (e.g. read-only memory (ROM)), flash memory, or any combination thereof. System memory 504 may include operating system 506, one or more program instructions 508, and may include sufficient computer-executable instructions for the SLT system 110, which when executed, perform functionalities as described herein. Operating system 506, for example, may be suitable for controlling the operation of computing device 500. Furthermore, aspects may be practiced in conjunction with a graphics library, other operating systems, or any other application program and is not limited to any particular application or system. This basic configuration is illustrated by those components within a dashed line 510. Computing device 500 may also include one or more input device(s) 512 (keyboard, mouse, pen, touch input device, etc.) and one or more output device(s) 514 (e.g., display, speakers, a printer, etc.).

The computing device 500 may also include additional data storage devices (removable or non-removable) such as, for example, magnetic disks, optical disks, or tape. Such additional storage is illustrated by a removable storage 516 and a non-removable storage 518. Computing device 500 may also contain a communication connection 520 that may allow computing device 500 to communicate with other computing devices 522, such as over a network in a distributed computing environment, for example, an intranet or the Internet. Communication connection 520 is one example of a communication medium, via which computer-readable transmission media (i.e., signals) may be propagated.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. In examples, the term computer-readable storage media is nontransitory computer-readable media and does not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 500 or any other computing devices 522, in combination with computing device 500, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure of the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

I claim:

1. A system for providing remote on-demand site link testing, the system comprising:
   at least one processor; and
   a memory coupled to the at least one processor, the memory including instructions that when executed by the at least one processor cause the system to:
   establish a communication session with a remote site link tester operatively connected to a Voice over Internet Protocol (VoIP) system at a customer site;
   via the communication session, instruct a phone emulation application included in the site link tester to initiate a test call with a test call endpoint;
   via the communication session, instruct a packet-capture application included in the site link tester to perform a packet capture process associated with the test call;
   receive packet capture results from the site link tester; and
   cause the packet capture results to be displayed in a user interface,
   wherein the system comprises a packet capture client configured to instruct the packet-capture application included in the site link tester,
   wherein the packet capture client is further configured to analyze the packet capture data in real time, and
   wherein the packet capture results include a message flow of the test call and associated packet capture metrics.

2. The system of claim 1, wherein the system comprises a softphone client configured to instruct the phone emulation application included in the site link tester.

3. The system of claim 2, wherein the softphone client is configured to:
   provide a phone user interface via which a user may enter or select a phone number or IP address of the test call endpoint;
   receive an entered or selected phone number or IP address of the test call endpoint; and
   provide the entered or selected phone number or IP address of the test call endpoint in instructions provided to the phone emulation application to initiate the test call.

4. The system of claim 1, wherein the packet capture client is further configured to:
   determine a packet error; and
   provide, via the user interface, an indication of the packet error.

5. The system of claim 1, wherein the communication session includes a Session Initiation Protocol (SIP) link via which a user of the system is enabled to verify audio quality of the test call via an operatively connected speaker and converse with a user of the test call endpoint via an operatively connected microphone.

6. The system of claim 5, wherein:
   the test call endpoint is a Public Safety Answering Point; and
   via the SIP link, the system enables the user of the system to:

verify audio quality of the test call;
verify the system is able to dial 911 directly; and
verify the Public Safety Answering Point receives correct dispatchable location information.

7. The system of claim 1, wherein prior to establishing the communication session, the system is further configured to:
receive a selection of the site link tester from a listing of site link testers; and
use an IP address associated with the selected site link tester to establish the communication session.

8. The system of claim 1, wherein the system is further configured to:
receive a selection to schedule the packet capture process for a date and time; and
at the date and time, establish the communication session with the site link tester.

9. A system for providing remote on-demand site link testing, the system comprising:
a phone emulation application;
a packet-capture application;
a network interface connected to a local area network at a customer site;
at least one processor; and
a memory coupled to the at least one processor, the memory including instructions that when executed by the at least one processor cause the system to:
in response to receiving instructions from a front-end application operating on a remote computing device to initiate a Voice over Internet Protocol (VoIP) test call to a test call endpoint, initiate the test call to the test call endpoint using the phone emulation application;
in response to receiving instructions from the front-end application to initiate a packet capture process on the network interface in association with the test call, initiate the packet capture process using the packet-capture application;
capture packets exchanged via the network interface in association with the test call; and
transmit packet capture results to the front-end application for display in a user interface,
wherein the packet capture application is further configured to analyze the packet capture data in real time, and
wherein the packet capture results include a message flow of the test call and associated packet capture metrics.

10. The system of claim 9, wherein the system is registered as a VoIP endpoint of a VoIP system at the customer site and comprises an IP address.

11. The system of claim 9, wherein the packet-capture application is further configured to
provide packet capture metrics.

12. The system of claim 11, wherein in analyzing the captured packets, the packet-capture application is further configured to:
determine a packet error; and
include an indication of the packet error in the packet capture results.

13. A method of providing remote on-demand site link testing, the system comprising:
establishing a communication session with a remote site link tester operatively connected to a Voice over Internet Protocol (VoIP) system;
via the communication session, instructing a phone emulation application included in the site link tester to initiate a test call with a test call endpoint;
via the communication session, instructing a packet-capture application included in the site link tester to perform a packet capture process associated with the test call;
analyzing the packet capture data in real time;
receiving packet capture results from the site link tester; and
causing the packet capture results to be displayed in a user interface,
wherein the packet capture results include a message flow of the test call and associated packet capture metrics.

14. The method of claim 13, further comprising:
providing a phone user interface via which a user may enter or select a phone number or IP address of the test call endpoint;
receiving an entered or selected phone number or IP address of the test call endpoint; and
providing the entered or selected phone number or IP address of the test call endpoint in instructions provided to the phone emulation application to initiate the test call.

15. The method of claim 13, wherein:
providing the entered or selected phone number or IP address of the test call endpoint comprises provided the phone number or IP address of a Public Safety Answering Point; and
via the communication session, enabling a user to
verify audio quality of the test call;
verify the system is able to dial 911 directly; and
verify the Public Safety Answering Point receives correct dispatchable location information.

16. The method of claim 13, further comprising:
determining a packet error; and
providing, via the user interface, an indication of the packet error.

* * * * *